United States Patent [19]

Kuriyama et al.

[11] Patent Number: 5,306,765
[45] Date of Patent: Apr. 26, 1994

[54] REACTIVE POLYMERS, DISPERSIONS THEREOF AND ARTICLES COATED THEREWITH

[75] Inventors: Satoshi Kuriyama; Shunichi Nakashima, both of Kyoto; Katsunori Takaki, Kawasaki; Kaoru Murata, Kyoto, all of Japan

[73] Assignee: Sanyo Chemical Industries, Ltd., Kyoto, Japan

[21] Appl. No.: 964,948

[22] Filed: Oct. 22, 1992

[51] Int. Cl.$^5$ ............................................... C08K 3/18
[52] U.S. Cl. ................................... 524/547; 524/458; 526/255; 526/279; 428/446; 428/473.5; 428/546
[58] Field of Search ............... 526/255, 279; 524/458, 524/547; 428/446, 473.5, 546

[56] References Cited

U.S. PATENT DOCUMENTS

| | | |
|---|---|---|
| 4,062,451 | 12/1977 | Gander ............................... 428/286 |
| 4,656,235 | 4/1987 | Tesoro et al. ........................ 526/279 |
| 4,711,943 | 12/1987 | Harvey, III ......................... 526/279 |
| 4,801,658 | 1/1989 | Furukawa et al. .................. 526/279 |
| 4,847,343 | 7/1989 | Barthelemy et al. ................ 526/279 |
| 4,981,934 | 1/1991 | Senzenberger et al. ............. 526/279 |
| 5,079,319 | 1/1992 | Mueller ............................... 526/279 |
| 5,081,164 | 1/1992 | Lai ...................................... 526/279 |
| 5,142,012 | 8/1992 | Furukawa et al. .................. 526/279 |

Primary Examiner—Kriellon S. Morgan
Attorney, Agent, or Firm—Oblon, Spivak, McClelland, Maier & Neustadt

[57] ABSTRACT

A reactive vinyl polymer containing units derived from a vinyl monomer (A) having a hydrolyzable silyl group and units derived from a vinyl monomer (B) having an aminimide group, in which the polymer obtained is used in preparation of dispersions suitable for coating of substrates to provide a tough, water-resistant film which optionally has a rust inhibiting effect on the substrate, if needed.

19 Claims, No Drawings

REACTIVE POLYMERS, DISPERSIONS THEREOF AND ARTICLES COATED THEREWITH

BACKGROUND OF THE INVENTION

Field of the Invention

The present invention relates to a reactive polymer, dispersion thereof and an article coated and cured therewith. In particular, the present invention relates to an aqueous dispersion containing the reactive polymer having a hydrolyzable silyl group and an aminimide group, which is stable and provides a tough and water-resistant film. The present invention also relates to a coating composition for rust-inhibition.

Background Discussion

Conventional organic solvent solution-based coating compositions have recently fallen into disfavor due to problems associated with environmental pollution, conservation of resources and providing a safe working environment. In their place, aqueous solution or dispersion type coating compositions have been proposed as alternatives. In particular, much attention has been paid to reactive polymer emulsions because of the ease with which they can be provided with improved water resistance.

One that has been proposed is a silyl group-containing polymer emulsion obtained by emulsion polymerization of 0.1 to 40 % by weight of a polymerizable monomer having a hydrolyzable silyl group, 50 to 99.9% by weight of alkyl (meth)acrylate having an alkyl group of from 1 to 18 carbon atoms and 0 to 40% by weight of another monomer in an aqueous medium (see U.S. Pat. No. 4,062,451).

However, such an emulsion has not become commercially viable due to insufficient shelf life caused by its tendency to gel over a long period of time. Thus the quality of the emulsion deteriorates over time and an aged gel is not as good as a freshly prepared one.

SUMMARY OF THE INVENTION

Accordingly, one object of the present invention is to provide a reactive, aqueous dispersion which is stable and gives a tough and water-resistant film.

Another object of the present invention is to provide a reactive aqueous dispersion which provides a membrane or film which is resistant to heat, acid, organic solvent, soil and weathering.

A further object of the present invention is to provide a reactive polymer having a hydrolyzable silyl group and an aminimide group for use in preparing the above dispersion.

Still a further object of the present invention is to provide an article coated and cured with the reactive polymer dispersion.

These and other objects of the present invention have been satisfied by the discovery of a dispersion comprising a vinyl based (co)polymer having a hydrolyzable silyl group and an aminimide group in the molecule and an article coated and cured with the dispersion.

DETAILED DESCRIPTION OF THE INVENTION

The present invention relates to a reactive vinyl (co)-polymer comprising (I) a copolymer obtained by copolymerization of a hydrolyzable silyl group-containing vinyl monomer (A) and an aminimide group-containing vinyl monomer (B), (II) a polymer obtained by incorporating an aminimide group into a polymer of the monomer (A), (III) a polymer obtained by incorporating a hydrolyzable silyl group into a polymer of the monomer (B) and (IV) a polymer obtained by incorporating both a hydrolyzable silyl group and an aminimide group into a vinyl polymer.

The monomer (A) includes compounds represented by formula:

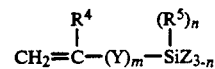

wherein:
R$^4$ is a hydrogen atom, a methyl group or an ethyl group;
R$^5$ is a methyl group or an ethyl group;
Y is a divalent organic group;
Z is a hydrolyzable group;
m is 0 or 1 and
n is integer of 0 to 2.

The divalent organic group includes C(O)OR' (where R' is an alkylene group of from 2 to 10 carbon atoms, preferably from 2 to 6 carbon atoms), a polyurethane moiety, a polyether moiety, a polyamide moiety, a polyester moiety and a hydrocarbon moiety having an epoxy group. Among these, C(O)OR' is preferred.

The hydrolyzable group Z, includes a halogenosilyl group, an acyloxysilyl group, amidosilyl group, aminoxysilyl group, alkenyloxysilyl group, aminosilyl group, oximesilyl group, alkoxysilyl group and thioalkoxysily) group, with alkoxysilyl group preferred.

Examples of monomer (A) include, vinyl silanes such as vinyl methyl dimethoxy silane, vinyl trimethoxy silane, vinyl triethoxy silane and vinyl tris (β-methoxy ethoxy) silane, (meth)acryloxy alkyl silanes such as γ-methacryloxy propyl trimethoxy silane, γ-methacryloxy propyl methyl dimethoxy silane, γ-methacryloxy propyl methyl diethoxy silane, γ-acryloxy propyl trimethoxy silane, γ-acryloxy propyl methyl diethoxy silane, γ-acryloxy propyl triethoxy silane and polyurethanes having a vinyl group and an alkoxyl group (described in Japanese patent application laid-open No. 26022/1985), such as a reaction product of 1 mole of γ-aminopropyl trimethoxy silane, 2-hydroxyethyl methacrylate and 1 mole of NCO-terminated prepolymer derived from isophorone diisocyanate and polycaprolactone triol having a number average molecular weight of 2,000, a reaction product of isocyanatopropyl triethoxy silane and mono (meth) acrylate of polypropylene glycol having a number average molecular weight of 4,000, a reaction product of isocyanatopropyl triethoxy silane and mono (meth)acrylate of polycaprolactone diol having number average molecular weight of 5,000 and a reaction product of an amino group containing polymer, such as polyamide, with glycidyl methacrylate and a silane coupling agent having an epoxy group. The monomer (A) also includes a reaction product of an adduct or condensate of bisphenol-A and epichlorohydrin and a silane coupling agent having an amino group. Preferably, monomer (A) is a (meth)acryloxyalkyl alkoxy silane or a polyurethane having a vinyl group and an alkoxysilyl group.

The monomer (B) includes compounds represented by formula:

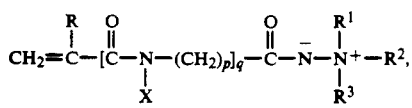

wherein:
R is a hydrogen atom, an alkyl group having from 1 to 6 carbon atoms or a cyano group;
$R^1$ and $R^2$ which may be the same or different, are each a hydrogen atom, an alkyl group, an aryl group or an aralkyl group;
$R^3$ is an alkyl group or hydroxyalkyl group;
X is an alkyl group, an aryl group or an aralkyl group;
p is an integer of from 1 to 3 and
q is 0 or 1.

Examples of monomer (B) include 1,1,1-trimethylamine methacrylimide, 1,1-dimethyl-1-ethylamine methacrylimide, 1,1,-dimethyl-1-(2-hydroxypropyl)amine methacrylimide, 1,1-dimethyl-1-(2'-phenyl-2'-hydroxyethyl)amine methacrylimide, 1,1-dimethyl-1-(2'-hydroxy-3'-phenoxypropyl)amine methacrylimide and 1,1,1-trimethylamine acrylimide. It also includes the compounds represented by the following formulas:

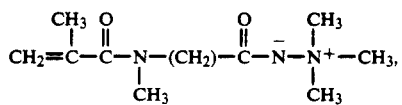

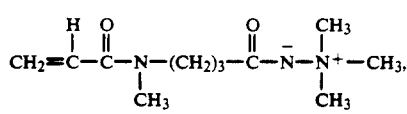

The amount of vinyl (co)polymer of the present invention which is derived from monomer (A) is from 0.5 to 95.5% by weight, preferably 0.5 to 50% by weight, more preferably 3 to 30% by weight based on the (co)polymer. The amount of vinyl (co)polymer of the present invention which is derived from monomer (B) is from 0.5 to 95.5% by weight, preferably 0.5 to 50% by weight, more preferably 1 to 30% by weight, most preferably 1.5 to 10% by weight based on the (co)polymer. When the amount of monomer (A) units in the polymer is less than 0.5% by weight, the polymer dispersion does not cure sufficiently resulting in a film with little water resistance. When the amount of monomer (A) units exceeds 50% by weight, the polymer dispersion gels too easily and has insufficient stability on storage. On the other hand, when the amount of monomer (B) units is less than 0.5% by weight, the storage stability of the polymer dispersion is poor due to its tendency to gel. Even if the amount of (B) units exceeds 50% by weight, the storage stability of the polymer dispersion is not further improved. Thus, due to the cost of monomer (B), it is best to use the minimum amount necessary to provide sufficient storage stability.

The vinyl polymer of the present invention has a weight average molecular weight of from 3,000 to 500,000, preferably 10,000 to 100,000.

The polymer of the present invention may optionally be prepared by copolymerizing another comonomer with monomers (A) and (B). The third monomer includes (C) a vinyl monomer having an ionic group or an ion forming group for improving dispersibility, (D) a vinyl monomer having a hydroxyl group for improvement of stability in the dispersion, (E) an alkyl (meth)acrylate monomer having an alkyl group of from 1 to 30 carbon atoms for improvement of weather resistance and water resistance, (F) a vinyl monomer having a perfluoroalkyl group of from 8 to 20 carbon atoms for improvement of water repellency, (G) a (meth)acrylate monomer having a polysiloxane group for lowering of surface friction and in its turn lowering stickiness and (H) a vinyl monomer different from any of monomers (A) to (G).

Monomer (C) can be a monomer (C1) for furnishing the dispersion with a cationic character or a monomer (C2) for furnishing the dispersion with an anionic character. Examples of cationic type monomers (C1) includes N,N-dimethylaminoethyl (meth)acrylate, N,N-dimethylaminoethyl (meth)acrylate, N,N-bisdimethylaminoethyl (meth)acrylamide, (meth)acryloyloxyethyl trimethyl ammonium chloride, and (meth)acryloyloxyethyl trimethyl ammonium methyl sulfate. Examples of anionic-type monomers (C2) include vinyl carboxylic acids such as (meth)acrylic acid, crotonic acid, sorbic acid, maleic acid, itaconic acid and cinnamic acid, vinyl sulfonic acids such as vinyl sulfonic acid, allyl sulfonic acid, vinyl toluene sulfonic acid and styrene sulfonic acid, (meth)acryl sulfonic acids such as (meth)acryloyloxyethyl sulfonic acid and (meth)acryloyloxypropyl sulfonic acid and (meth)acrylamide sulfonic acids such as 2-vinylcarbamoyl-2-methylpropane sulfonic acid.

For (C1) and (C2), N,N-dimethylaminoethyl (meth)acrylate and (meth)acrylic acid are preferred, respectively.

The content of units derived from monomer (C) in the vinyl polymer of the present invention is from 0.5 to 30% by weight, preferably 1 to 15% by weight based on the polymer.

Examples of monomer (D) include 2-hydroxyethyl (meth)acrylate, 2-hydroxypropyl (meth)acrylate, 3-hydroxypropyl (meth)acrylate and acrylate monoester of diethylene glycol, with 2-hydroxyethyl (meth)acrylate being preferred.

The content of units derived from monomer (D) in the vinyl polymer of the present invention is from 1 to 40% by weight, preferably 2 to 20% by weight based on the polymer.

Examples of monomer (E) include methyl (meth)acrylate, ethyl (meth)acrylate, n- or iso-propyl (meth)acrylate, n- or iso-butyl (meth)acrylate, 2-ethylhexyl (meth)acrylate, n-lauryl (meth)acrylate, n-cetyl (meth)acrylate, stearyl (meth)acrylate, n-oleyl (meth)acrylate and behenyl (meth)acrylate, with methyl (meth)acrylate and n-butyl (meth)acrylate being preferred.

The content of units derived from monomer (E) in the vinyl polymer of the present invention is from 30 to 90% by weight, preferably 40 to 80% by weight based on the polymer.

Examples of monomer (F) include compounds represented by the following formulas:

i) $CF_3(CF_2)_5(CH_2)_2OCOC(CH_3)=CH_2$
ii) $CF_3(CF_2)_9(CH_2)_2OCOCH=CH_2$
iii) $HCF_2(CF_2)_9(CH_2)_2OCOC(CH_3)=CH_2$
iv) $C_8F_{17}CH_2CH(OH)CH_2OCOC(CH_3)=CH_2$
v) $CF_3CF(CF_3)(CF_2)_6(CH_2)_2OCOC(CH_3)=CH_2$
vi) $H_2CF(CF_2)_9(CH_2)_2OCOC(CH_3)=CH_2$
vii) $C_8F_{17}SO_2N(CH_2CH_2OCOCH=CH_2)_2$
viii) $C_8F_{17}SO_2N(CH_3)(CH_2)_2OCOCH=CH_2$
ix) $C_8F_{17}(CH_2)_{11}OCOC(CH_3)=CH_2$
x) $C_8F_{17}(CH_2)_{11}OCOCH=CH_2$
xi) $C_7F_{15}CON(CH_3CH_2)(CH_2)_2OCOC(CH_3)=CH_2$ -continued xii) $C_8F_{17}(CH_2)_{11}OCOCH=CHCOOCH_2C_7F_{15}$
xiii) $C_8F_{17}(CH_2)_{11}OCOCH=CHCOOCH_3$
xiv) $C_7F_{15}CH_2OCH_2CH=CH_2$
xv) $C_8F_{17}SO_2NHCH_2SO_2CH=CH_2$ Among these, compounds i) and ii) are preferred.

The content of units derived from monomer (F) in the vinyl polymer of the present invention is from 1 to 60% by weight, preferably 3 to 40% by weight based on the polymer.

Examples of monomer (G) include compounds represented by the following formulas:

xvi) $CH_2=CHCOO(CH_2)_3[Si(CH_3)_2O]_nSi(CH_3)_3$
xvii) $CH_2=C(CH_3)COOC_6H_4[Si(CH_3)_2O]_nSi(CH_3)_3$
xviii) $CH_2=C(CH_3)COO(CH_2)_3[Si(CH_3)_2O]_nSi(CH_3)_3$
xix) $CH_2=C(CH_3)COO(CH_2)_3[Si(CH_3)(C_6H_5)O]_nSi(CH_3)_3$
xx) $CH_2=C(CH_3)COO(CH_2)_3[Si(C_6H_5)2O]_nSi(CH_3)_3$ wherein n is a value ranging from 0 to 130. Preferred among these is compound xvi).

The content of units derived from monomer (G) in the vinyl polymer of the present invention is from 1 to 40% by weight, preferably from 3 to 20% by weight based on the polymer.

Examples of monomer (H) include aromatic vinyl monomers such as styrene, α-methylstyrene and α-chlorostyrene, halogenated vinyl monomers such as vinyl chloride, alkyl or cycloalkyl vinylethers such as methyl vinylether, cyclohexyl vinylether, vinyl esters such as vinyl acetate, monomers having a nitrile group such as acrylonitrile, monomers having a carbamoyl group such as (meth)acrylamide, crotonamide, N-methylol acrylamide and fumardiamide, epoxy group-containing vinyl monomers such as glycidyl (meth)acrylate and oligomers having at least one polymerizable double bond in addition to a polyurethane moiety, a polyether moiety, a polyamide moiety, an epoxy resin moiety or a polyester moiety, such as esters of polycaprolactonediol and (meth)acrylic acid (commercially available as "PRACCEL FM-1, FM-5 and FA-5" from NIHON YUSI company in Japan), esters of polyoxyalkylene glycol and acrylic acid (also commercially available from NIHON YUSI as "BLENMER PE-200, PE-350, PP-300 and PP-800"), a reaction product of 1 mole of OH-terminated prepolymer from poly-tetramethylene glycol and isophorone diisocyanate and 1 mole of isocyanatoethyl acrylate and a reaction product of polyamide and acrylate ester. Among these styrene and (meth)acrylamide are preferred.

The content of units derived from monomer (H) in the vinyl polymer of the present invention is from 1 to 40% by weight, preferably from 3 to 20% by weight based on the polymer.

The dispersion medium of the present invention includes water and a mixture of water and organic solvent. Suitable organic solvents include water-soluble solvents, such as alcohols of from 1 to 4 carbon atoms and ketones such as acetone and methyl ethyl ketone and water-insoluble solvents such as low aliphatic hydrocarbons and low aromatic hydrocarbons, with water being preferred.

Polymers of the present invention may be prepared by any conventional method. For example, polymer (I) of the present invention can be prepared by polymerizing monomer (A) and monomer (B) in the presence or absence of a radical initiator, with any one of the monomers (C) to (H), if desired.

Polymer (II) of the present invention may be obtained, by preparing a vinyl polymer having both an aminimide group and a vinyl group obtained from monomer (B) and allyl methacrylate in advance, followed by adding an equivalent amount of a hydrosilane compound to the double bond in the resulting polymer molecule in the presence of a catalyst containing a Group VIII transition metal. Polymer (III) of the present invention may be prepared by reacting a copolymer prepared from a vinyl silane and methyl methacrylate with 1,1-dimethyl hydrazine and propylene oxide. Polymer (IV) may be prepared by a combination of the preparative methods for polymer (II) and polymer (III). The preferred method for preparing the polymer of the present invention is the method for polymer (I).

The polymer dispersion of the present invention is prepared by emulsifying a polymer, having a hydrolyzable silyl group and an aminimide group, with the help of a non-polymerizable emulsifier or a pH adjuster, if necessary, where the polymer is prepared by solution polymerization, or by emulsion polymerization. In the case of solution polymerization, the dispersion can be prepared by polymerizing monomer (A) and monomer (B) (with one or more other monomers if desired) in the presence or absence of an initiator, by means of heat, electronic ray or ultra-violet ray, followed by emulsifying.

Suitable initiators include azo compounds such as azobisisobutyronitrile, 2,2-azobis(2,4-dimethyl valeronitrile), azobiscyanovaleric acid, 2,2-azobis(2-amidinopropane)hydrochloride and 2,2-azobis(2-amidinopropane)acetate, inorganic peroxides such as hydrogen peroxide, ammonium persulfate, potassium persulfate and sodium persulfate, organic peroxides such as dibenzoyl peroxide, di-t-butyl peroxide, cumene hydroperoxide and di-(2-ethoxyethyl)peroxydicarbonate and redox catalysts such as combinations of a reducing agent, such as a sulfite salt or hydrogen sulfite salt of an alkali metal, ammonium sulfite, 1-ascorbic acid or erythraric acid, and an oxidant such as a persulfate salt of an alkali metal, ammonium persulfate or peroxide.

The initiator is used in an amount of 0.001 to 20% by weight, preferably 0.1 to 10% by weight based on the total amount of monomer used.

A chain transfer agent may be optionally used to control the molecular weight of the polymer of the present invention. Suitable chain transfer agents include n-lauryl mercaptan, n-dodecyl mercaptan, t-dodecyl mercaptan, γ-mercaptopropyl trimethoxy silane and γ-mercaptopropyl methyldimethoxy silane, with n-lauryl mercaptan being preferred.

An organic solvent may also be used in preparing the polymer of the present invention. Suitable solvents include $C_1-C_6$ alcohols such as ethanol, isopropanol and n-butanol, $C_6-C_{10}$ aromatic hydrocarbons such as toluene and xylene, $C_5-C_{10}$ aliphatic hydrocarbons such as hexane, cyclohexane and decalin, aliphatic esters such as ethyl acetate and n-butyl acetate, aliphatic ketones such as acetone and methyl ethyl ketone and aliphatic ethers such as dioxane and tetrahydrofuran. A low boiling-point solvent is preferred to provide easy removal of the solvent and a water-soluble solvent is also preferred to provide easy emulsification. Iso-propanol, toluene, methyl ethyl ketone or a mixture thereof are most preferred.

The weight ratio of the solvent to the total amount of monomer is in the range of 1:10 to 10:1, preferably from 1:5 to 5:1.

Suitable non-polymerizable emulsifiers include anionic surface active agents such as alkyl sulfate salts, alkyl aryl sulfonate salts, alkyl phosphate salts and fatty acid salts, cationic surface active agents such as acid salts of alkyl amines, alkyl quaternary ammonium salts, nonionic surface active agents such as polyoxyethylenealkylaryl ethers, polyoxyethylene alkyl ethers, surface active agents of pluronic type and amphoteric surface active agents such as amino acids and aminosulfonic acids.

Suitable pH adjusters include inorganic acids such as hydrogen chloride, phosphoric acid, nitric acid and formic acid, organic acids such as acetic acid, propionic acid, tactic acid, (meth)acrylic acid, oxalic acid, citric acid, maleic acid, itaconic acid and adipic acid, amines such as ammonia, methyl amine, dimethyl amine, diethanol amine, dimethylamino ethanol and triethyl amine, alkaline agents such as potassium hydroxide and sodium hydroxide. The mole ratio of pH adjuster to the total moles of monomer (A) and monomer (C) is 0.3 to 1.5, preferably 0.5 to 1.0.

Due to the presence of an aminimide group, the vinyl polymer of the present invention is amphoteric providing improved hydrophilicity with the help of both an acidic adjuster and an alkaline adjuster.

The emulsification temperature should be kept as low as possible, preferably from 0° C. to 70° C., more preferably from 5° C. to 50° C.

When the dispersion of the present invention is prepared by emulsification polymerization, conventional polymerizable emulsifiers can be used. Suitable polymerizable emulsifiers are of cationic type, anionic type or nonionic type and have a polymerizable group, such as a (meth)acryl group, and a hydrophilic group, such as a quaternary ammonium salt, a tertiary amine acid salt, an aminimide group, a sulfonate salt, a carboxylate salt or an oxyethylene group.

The polymerizable emulsifier is used in an amount of from 0.1 to 20% by weight, preferably from 0.5 to 10% by weight based on the total amount of monomer.

The polymerization temperature is usually 50° to 150° C., preferably 70° to 130° C. In both the solution polymerization method and the emulsification polymerization method, the polymerization temperature is from 50° C. to 150° C., preferably from 70° C. to 130° C., for a reaction time of from 1 to 10 hours, preferably from 2 to 7 hours.

The dispersion of the present invention may additionally contain a silane compound for increased cross-linking and better adhesion to various substrates or a protective colloid for improved dispersion stability.

The silane compound is added before emulsification or during emulsification, and is incorporated within a micelle of the dispersion. Suitable silane compounds include methyl trimethoxy silane, tetramethoxy silane, tetraethoxy silane, vinyl triethoxy silane, γ-methacryloxy propyl trimethoxy silane, γ-glycidoxy propyl trimethoxy silane, γ-aminopropyl trimethoxy silane, γ-ureidopropyl triethoxy silane, tetramethy silicate and tetraethyl silicate.

Suitable protective colloids include partially saponified polyvinyl acetate, carboxymethyl cellulose, methyl cellulose, hydroxyethyl cellulose and hydroxy propyl cellulose.

The dispersion of the present invention may further contain an uncured epoxy resin for providing anti-corrosivity to the coating. The epoxy resin may also be added before emulsification or during emulsification. Suitable epoxy resins include epoxy resins of phenolic ether type such as bisphenol A type epoxy resin, epoxy resins of ether type, epoxy resins of ester type, epoxy resins of glycidyl amine type, epoxydated aliphatic hydrocarbons, epoxydated alicyclic hydrocarbons and uncured epoxy resins such as those described at pages 6 to 9 of *EPOXY RESINS*, published by McGraw-Hill Book Company in the U.S. in 1957. Among these, epoxy resins of phenolic ether type are preferred.

The epoxy equivalent level of the uncured epoxy resin is from 100 to 3,000, preferably from 200 to 2,000.

The dispersion of the present invention may optionally contain an additional dispersion such as an acrylic emulsion, a urethane emulsion, an epoxy emulsion or a polyvinylchloride emulsion, with a urethane emulsion preferred.

The urethane emulsion may be of either self-emulsion type or non-self-emulsion type (requiring an emulsifying agent). The polyurethane resin for such an urethane emulsion can be prepared by reacting a polyol, a polyamine or a combination thereof with a polyisocyanate using either conventional prepolymer or one-shot methods.

Suitable polyols include high molecular weight polyols such as polyether polyols, polyester polyols, polycarbonate polyols and polyether-ester polyls, which have a molecular weight of from 500 to 5,000 and low molecular weight polyols such as glycol, glycerin, trimethylol propane and alkylene oxide adducts thereof having a molecular weight of below 500.

The urethane emulsion of self-emulsion type can be prepared by incorporating an ion-forming group into the polyurethane molecule followed by addition of a neutralizing agent. Suitable neutralizing agents include amines, such as dimethylamino ethanol and triethyl amine and acids, such as formic acid and acetic acid. Compounds having an ion forming group include dimethylol alkane carboxylic acids such as dimethylol propionic acid and dimethylol acetic acid and dihydroxy compound having a tertiary amino group such as N-methyl diethanolamine. The polyisocyanate can be an aromatic polyisocyanate such as diphenyl methane diisocyanate (MDI) and tolylene diisocyanate, an aliphatic polyisocyanate such as hexamethylene diisocyanate or an alicyclic polyisocyanate such as isophorone di-isocyanate and dicyclohexyl diisocyanate. The reaction of polyol and polyisocyanate is carried out at a temperature of from room temperature (18° to 25° C.) to 200° C., preferably 50° to 150° C., in the presence or absence of solvent such as ketones or esters to provide a polyurethane resin having a molecular weight of from 2,000 to 500,000, preferably from 5,000 to 250,000.

The dispersion of the present invention may optionally contain a cross-linking agent. Suitable cross-linking agents include amino group-containing resins such as urea resins which are methylolated or alcohoxylated or both and melamine resins which are methylolated or alcohoxylated or both, the above described uncured epoxy resins, ethylene urea compounds such as diphenyl methane bis (4,4',N,N'-ethylene urea) and polyisocyanates such as an adduct of trimethylol propane and hexamethylene diisocyanate, isophorone diisocyanate or tolylene diisocyanate, hexamethylene diisocyanate modified by water, trimers of isophorone diisocyanate or hexamethylene diisocyanate, polyisocyanates masked by phenol, methyl ethyl ketone oxime or c-caprolactone and organic metal coordination compounds such as aluminum acetyl acetonate, aluminum triisopropoxide, zirconium tetrakis(acetyl acetonate) and diisopropoxy titan acetyl acetonate, with amino group-containing resins being preferred.

The weight ratio of the dispersion of the present invention to the urethane emulsion is from 10:1 to 1:10, preferably from 5:1 to 1:5, based on their dry solids content.

The content of the cross-linking agent to total solids content of both the dispersion of the present invention and the additional dispersion is from 0.1 to 100% by weight, preferably 0.2 to 50% by weight. The dispersion of the present invention displays physical properties of flexibility and stiffness proportional to the levels of urethane emulsion and cross-linking agent used, respectively.

The vinyl polymer of the present invention may be further cross-linked or networked by heating at a temperature of about 200° C. The additional crosslinking occurs due to the presence of an isocyanate group generated by thermal decomposition of the aminimide group. This isocyanate reacts with an active hydrogen atom-containing group in the polymer or with another isocyanate group, providing a higher degree of cross-linking and resulting in further improved resistance to water.

The reactive dispersion of the present invention optionally contains one or more further additives such as pigments for paint, catalysts for acceleration of curing, ultra-violet absorbing agents, antioxidants, chemicals for improvement of heat-resistance, leveling agents, anti-sagging agents and flatting agents. Preferably these additives are water-dispersible in order to improve compatibility with the dispersion.

Suitable pigments include body pigments such as calcium carbonate, kaolin, talc, aluminum silicate and silica, inorganic pigments such as titanium oxide, iron oxide, chrome yellow, cadmium oxide, carbon black, and aluminum flake, organic pigments of azo type, azo-lake type, phthalocyanine type, quinacridone type and isoindolinone type, and rust-inhibiting agents such as an oxide of barium, zinc, chrome, molybdenum or aluminum. Examples of suitable rust-inhibiting agents are strontium chromate, barium chromate ($BaCrO_4$), zinc chromate ZTO ($ZnCrO_4.4Zn(OH)_2$), aluminum phosphorous molybdate ($Mo_3.P_2O_5.Al_2O_3$), zinc phosphate ($3ZnO.P_2O_5.nH_2O$, $mZnO.P_2O_5$), calcium molybdate ($CaO.MoO_3.K_2O$. $P_2O_5$), calcium phosphate complex, zinc calcium cyanamide ($ZnO$. $CaCN_2$), aluminum phosphate ($AlH_2P_3H_2O$) and barium metaborate. While chromium (VI)-containing pigments show high rust inhibition activity, they are undesirable due to environmental pollution factors.

Phosphate type pigments are preferred.

The pigment is used in the dispersion of the present invention at a level of from 1 to 200% by weight, preferably 5 to 100% by weight, based on the dispersion.

Suitable curing catalysts include organic titanate compounds, such as isopropyl triisostearoyl titanate, isopropyl tri(dioctylpyrophosphato) titanate, and tetraisopropyl dilauryl phosphite titanate, organic aluminum compounds, such as acetoalkoxyl aluminum diisopropylate, metal carboxylate compounds, such as stannous dioctylate, dibutyl tin dilaurate and dibutyl tin maleate, sodium acetate, zinc caproate, lead octylate, cobalt naphthenate, sulfur atom-containing compounds, such as dibutyl tin disulfide, dialkyl tin oxides, such as dibutyl tin oxide and dioctyl tin oxide, phosphate esters, such as monomethyl phosphate, diethyl phosphate, dimethyl phosphate and monobutyl phosphate, carboxylic acids or anhydrides such as adipic acid, maleic acid, citric acid, itaconic acid, succinic acid, and phthalic acid, trimellitic acid, maleic anhydride, phthalic anhydride, amino silane compounds such as γ-aminopropyl triethoxy silane, γ-aminopropyl trimethoxy silane, amines or amine salts such as triethyl amine, dibutyl ammonium 2-hexoate, cyclic amidines and salts thereof and quaternary ammonium salts such as tetrabutyl ammonium hydroxide.

The catalyst is preferably water-soluble or water-dispersible since oil-soluble catalysts tend to destroy micelles. The metal carboxylate compounds are especially preferred.

The amount of catalyst used in the dispersion of the present invention is from 0.001 to 20% by weight, preferably 0.01 to 5% by weight, based on the total dispersion.

A coating composition containing the dispersion of the present invention is prepared by mixing with one or more of the above-mentioned additives, by means of a ball-mill, kneader, sand-grinder, roll-mill or flat stone-mill.

The dispersion of the present invention may be used for brush coating, trowel coating, roller coating, spray coating, flood coating or impregnation coating of various substrates. Suitable substrates include those made of glass, asbestos, ceramics, metal such as iron, tin, zinc and aluminum, wood, rubber, plastics, fiber and paper, with substrates made from glass, asbestos, ceramics, metal or plastic being preferred.

The coating composition is applied at a thickness of from 1 to 200 microns, preferably 5 to 100 microns, based on the thickness of the dry coating.

The dispersion of the present invention is also usable as a coating, primer or adhesive.

The polymer dispersion of the present invention has many advantages such as:

(1) The dispersion retains long-term shelf life and no change in quality during the shelf life even while remaining moisture-curable. Thus, the dispersion is superior in shelf life compared with prior art dispersions having a hydrolyzable silyl group.
(2) It is curable over a broad temperature range, with the curability being accelerated by heat to provide a tough film by removal of water.
(3) It has the properties of resistance to water, heat, acid, solvent, soil and weathering.
(4) It has good adhesion to a wide variety of substrates, either inorganic or organic in nature.
(5) Dispersions containing an uncured epoxy resin and a rust-inhibiting pigment display resistance to corrosion in spite of using aqueous media.
(6) Dispersions containing a urethane emulsion give a coating film with improved hardness and flexibility without decreased water resistance.
(7) The dispersion of the present invention is useful for paints, adhesives, primers and resin modifiers. The preferred usages are in paints which are resistant to weathering, acidic rain, soil and corrosion, water-repelling agents, primers for building materials, electro-deposition paints, upper coatings, mending paints for vehicles, especially automobiles, hard coatings, coatings for cans and plastics such as PVC, rust-inhibiting paints, releasing agents for paper used in communication fields, coatings for dampproofing of electronic parts, coatings for insulation, back-coatings for ink ribbons and magnetic tapes, ink binders and finishing agents for textiles and paper.

Having generally described the present invention, a further understanding can be obtained by reference to certain specific examples which are provided herein for purposes of illustration only and are not intended to be limiting unless otherwise specified.

EXAMPLES

The dispersion of the present invention has been evaluated for dispersibility, stability, adhesion, hardness, water-resistance and solvent-resistance in accordance with the following methods.

Dispersibility and Stability:
The degree of particle sedimentation in the dispersion was judged visually.

Adhesion:
The adhesion between a film from the dispersion coated on a substrate and the substrate was measured by pressing an adhesive plastic tape onto the film, then peeling it off. Prior to application of the tape, the film was flawed with a checked pattern of 25 mm squares.

Resistance to water:
A coating film made from the dispersion was kept immersed for a week in purified water at 25° C. with an ion exchange resin and surface phenomena such as blister and fogging were judged visually.

Resistance to solvent:
A film made from the dispersion was placed on a substrate and immersed in toluene. Phenomena such as floating and flaking were judged.

Rust resistance:
Rust resistance was judged by generation of blister or rust in accordance with JAPANESE STANDARD INDUSTRY Z-2371 (using saline water for 500 hours)

Acid resistance:
Acid resistance was determined by placing one drop of 40% sulfuric acid on a plate coated with the dispersion, heating the plate at 50° C. for 15 minutes followed by washing with water.

Impact resistance:
Impact resistance was determined, using a DuPont type impact tester, as the height from which a 500 g steel ball of 0.5 inches radius can be dropped onto a plate coated with the dispersion without cracking the coating.

EXAMPLE 1

A mixture of the following components was added dropwise to 80 grams of isopropanol at 80° C. over a period of 3 hours.

| | |
|---|---|
| γ-methacryloxy propyl trimethoxy silane (hereinafter abbreviated MP silane) | 15 g |
| 1,1-dimethyl-1-(2-hydroxypropyl) amine methacrylimide (hereinafter abbreviated AI) | 3 g |
| 2-hydroxyethyl acrylate (hereinafter abbreviated HEA) | 6 g |
| methyl methacrylate (hereinafter abbreviated MMA) | 40 g |
| n-butyl acrylate(hereinafter abbreviated BA) | 29 g |
| acrylic acid (hereinafter abbreviated AA) | 7 g |
| n-lauryl mercaptan (hereinafter abbreviated LM) | 2 g |
| azobisisovaleronitrile (hereinafter abbreviated AIVN) | 2 g |
| isopropanol (hereinafter abbreviated IPA) | 20 g |

The resulting reaction mixture was heated at the same temperature for an additional 2 hours, 0.3 g of AIVN was added and the mixture heated for 2 more hours, to obtain a 50% copolymer solution in IPA. A dispersion was prepared by mixing 3.2 g of 28% concentrated aqueous ammonia solution with the resulting copolymer solution at 20° to 40° C. followed by adding 250 g of water. A 30% concentrated polymer dispersion [1]of the present invention was obtained by adding water after removal of IPA below at 50° C.

EXAMPLE 2~5 AND COMPARISON 1, 2

The polymer dispersions [2]~[7] were obtained in the same manner as Example I by using the components shown in Table 1.

TABLE 1

| Polymer dispersion No. | Example | | | | Comparison | |
|---|---|---|---|---|---|---|
| | 2 [2] | 3 [3] | 4 [4] | 5 [5] | 1 [6] | 2 [7] |
| Component/grams | | | | | | |
| MP silane | 10 | 10 | 20 | 7 | 10 | 10 |
| AI | 5 | 5 | 3 | 2.5 | — | — |
| AA | — | 3 | 7 | 8 | — | 5 |
| DMAEM | 5 | — | — | — | 10 | — |
| CMA | — | 15 | — | — | — | 5 |
| MMA | 25 | 30 | 30 | 35.5 | 30 | 30 |
| BA | 30 | 22 | 25 | 25 | 35 | 20 |
| BMA | 15 | 15 | — | 17 | 10 | 10 |
| HEA | 10 | 5 | 15 | 6 | 5 | 20 |
| LM | 2 | 1 | 2 | 2 | 2 | 2 |
| AIVN | 2 | 1 | 2 | 2 | 2 | 2 |
| IPA | 100 | 100 | 100 | 100 | 100 | 100 |
| Sum | 204 | 202 | 204 | 204 | 204 | 204 |
| Neutralizing agent | | | | | | |
| acetic acid | 5.0 | — | — | — | 4.0 | — |
| 28% conc. aq. ammonia | — | 3.2 | 3.2 | 2.4 | — | 3.0 |

CMA: n-cetyl methacrylate
BMA: n-butyl methacrylate
DMAEM: N,N-dimethylaminoethyl methacrylate

EVALUATION

One hundred grams each of polymer dispersions [1], [2] and [6] were mixed with 2 g of 20% concentration dispersion of dibutyl tin oxide in water. The polymer dispersions [3]~[5] and [7] were without dibutyl tin oxide.

Each test piece was made by coating each of them onto an aluminum plate at a dried thickness of 50 microns followed by heating at 100° C. for 30 minutes and standing at room temperature for a week. Evaluation of freshly prepared polymer dispersions is described in Table 2. Evaluation of the polymer dispersions stored at 50° C. for a month is described in Table 3.

TABLE 2

| | Polymer dispersion | | | | | | |
|---|---|---|---|---|---|---|---|
| | [1] | [2] | [3] | [4] | [5] | [6] | [7] |
| Dispersiblity and Stability | Good | Good | Good | Good | Good | Good | Good |

TABLE 2-continued

|  | Polymer dispersion | | | | | | |
|---|---|---|---|---|---|---|---|
|  | [1] | [2] | [3] | [4] | [5] | [6] | [7] |
| Adhesion to Aluminum plate | Good | Good | Good | Good | Good | Good | Good |
| Hardness | HB | B | 2B | H | HB | 3B | 2B |
| Water resistance | Good | Good | Good | Good | Good | Good | Good |
| Solvent resistance | Fair | Fair | Good | Good | Fair | Fair | Good |

TABLE 3

|  | Polymer dispersion | | | | | | |
|---|---|---|---|---|---|---|---|
|  | [1] | [2] | [3] | [4] | [5] | [6] | [7] |
| Dispersiblity and Stability | Good | Good | Good | Good | Good | Gelled | Gelled |
| Adhesion to Aluminum plate | Good | Good | Good | Good | Good | Good | " |
| Hardness | HB | B | 2B | H | F | not measurable | " |
| Water resistance | Good | Good | Good | Good | Good | not measurable | " |
| Solvent resistance | Fair | Fair | Good | Good | Fair | not measurable | " |

EXAMPLE 6

Each of the following components was added dropwise to 83 grams of isopropanol at 80° C. over a period of 3 hours.

|  |  |
|---|---|
| MP silane | 6.5 g |
| AI | 2.5 g |
| HEA | 14 g |
| MMA | 27 g |
| BA | 26 g |
| AA | 6 g |
| BMA | 18 g |
| LM | 2 g |
| AIVN | 1 g |

The resulting reaction mixture was heated at the same temperature for an additional 2 hours, 0.2 g of AIVN was added and the mixture heated for 2 more hours to obtain a 52% copolymer solution in IPA. A dispersion was prepared by adding in the following order: 2 g of methanol, 1.3 g of Epicote 828 (available from Yuka Shell company in Japan), 3.2 g of 28% concentrated aqueous ammonia solution, and the resulting copolymer solution was heated at 20° to 40° C. followed by adding 250 g of water. A 30% concentrated polymer dispersion [9] of the present invention was obtained by dilution with water after removal of IPA at 60° C. under reduced pressure. The painted polymer dispersion [10] was obtained by mixing in the following order: 6 g of LF BOSEI PW-2 (a rust-inhibiting pigment of zinc phosphate type, available from Kikuchi Colorant Industries company in Japan), 5 g of Talc SSS (available from Nihon Talc Company in Japan), 5 g of titan oxide, 1 g of Carbon Black MA-100 (available from Mitsubishi Kasei Industries in Japan), REOLOSIL TA-10 (fumed silica, available from Tokuyama Soda Company in Japan) and 0.5 g of dimethylamino ethanol with the polymer dispersion [9] in a paint conditioner accompanied with 50 g of steel balls for 30 minutes.

EXAMPLE 7

The paint polymer dispersion [11] was obtained by mixing in order: 4 g of aluminum phosphorous molybdate PM-30 (available from Kikuchi Colorants Industries company in Japan), 4 g of Talc SSS (available from Nihon Talc Company in Japan), 5 g of titan oxide, Ig of Carbon Black MA-100 (available from Mitsubishi Kasei Industries in Japan), REOLOSIL TA-10 (fumed silica, available from Tokuyama Soda Company in Japan) and 0.6 g of dimethylamino ethanol with the polymer dispersion [9] in a paint conditioner in the same manner as Example 6.

The resulting paint dispersion and Black W/R Dip Enamel 4B LW-42933B (aqueous rust-inhibiting paint of modified alkyd resin type, available from AKZO Company in Netherlands), Comparison 3, were respectively sprayed on sand-blasted steel plate at a dried thickness of 30 microns and allowed to stand at room temperature for 10 days. The evaluation of mechanical properties is reported in Table 3. Both painted dispersions were stable after storage at 50° C. for a month and thus the aged dispersions were also coatable and curable.

EXAMPLES 8 AND 9

Preparation of Urethane Emulsion

An NCO-terminated prepolymer of 4.1% NCO content was prepared by mixing 231 g of polycaprolactone diol of number average molecular weight of 2,000, 231 g of polybutylene adipate of number average molecular weight of 2,000, 46.4 g of dimethylol propionic acid and 13.0 g of 1,4-butane diol with 240.2 g of isophorone diisocyanate and reacting at 85° C. for 8 hours. The prepolymer was cooled to 50° C. and then dissolved in 330 g of acetone. The prepolymer solution in acetone was mixed with 31.4 g of triethyl amine and then chain-extended by mixing, at a temperature of below 50° C., with 1150 g of water purified by passing through an ion exchange resin. After removal of acetone below 70° C. under reduced pressure, a 42% urethane emulsion was obtained.

PREPARATION OF CROSS-LINKING AGENT 83 g of Uban 28SE (hydrophobic melamine resin, available from Mitsui Toatsu Chemical Industries Company in Japan) was mixed with 40 g of aqueous acrylic resin solution, prepared from 36 mole % of n-butyl acrylate, 37 mole % of methyl methacrylate, 10 mole % of styrene, 10 mole % of 2-hydroxyethyl methacrylate and 6 mole % of acrylic acid, and then mixed with 160g of water while stirring at 1,000 to 1,500 r.p.m. for 30 minutes. Thus, an aqueous dispersion of average particle size of 0.12 microns was obtained for use as a cross-linking agent.

One hundred grams of dispersion [1] of the present invention was mixed with 70 g of the above urethane emulsion and 50 g of the above cross-linking agent for one hour and then mixed with 0.1 g of dimethylamino ethanol to adjust to pH 7.8. Thus, the polymer dispersion [12], Example 8, was obtained. The polymer dispersion [13], Example 9, was obtained in the same manner as above by using dispersion [2] in place of dispersion [1].

COMPARISON 4

Dispersion [14] was obtained by mixing the above urethane emulsion with 30 g of the above cross-linking agent.

Dispersions [12] to [14] were respectively sprayed on a steel plate at a dried thickness of 30 microns, which was then treated with zinc phosphate, electro-deposited and coated with amino polyester resin. The sprayed plates were dried and cured at 140° C. for 20 min. The test results are shown in Table 5.

TABLE 4

|                  | Example 6     | Example 7     | Comparison 3 |
|------------------|---------------|---------------|--------------|
| Hardness         | H             | HB            | H            |
| Adhesion         | Good          | Good          | Good         |
| Water resistance | Good          | Good          | Good         |
| Blistering       | Did not occur | Did not occur | Occurred     |
| Rusting          | Did not occur | Did not occur | Occurred     |

TABLE 5

|                  | Example 8 | Example 9 | Comparison 4 |
|------------------|-----------|-----------|--------------|
| Hardness         | HB        | HB        | 2B           |
| Adhesion         | Good      | Good      | Good         |
| Water resistance | Good      | Good      | Poor         |
| Acid resistance  | Fair      | Fair      | Poor         |
| Impact resistance| 30 cm     | 30 cm     | 40 cm        |

What is claimed as new and desired to be secured by Letters Patent of the United States is:

1. A reactive vinyl polymer comprising from 0.5 to 95.5% by weight of units derived from a vinyl monomer (A) having a hydrolyzable silyl group and 0.5 to 95.5% by weight of units derived from a vinyl monomer (B) having an aminimide group.

2. A dispersion comprising a reactive vinyl polymer in a dispersion medium wherein said reactive vinyl polymer has a hydrolyzable silyl group and an aminimide group.

3. A dispersion according to claim 2, wherein said polymer comprises from 0.5 to 50% by weight of units derived from a vinyl monomer (A) having a hydrolyzable silyl group and 0.5 to 95.5% by weight of units derived from a vinyl monomer (B) having an aminimide group.

4. A dispersion according to claim 3, wherein said monomer (B) is an aminimide compound having the structural formula:

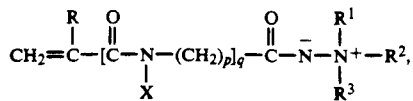

wherein:
R is a hydrogen atom, an alkyl group having 1 to 6 carbon atoms or a cyano group;
R₁ and R₂, which may be the same or different, are a hydrogen atom, an alkyl group, an aryl group or an aralkyl group;
R₃ is an alkyl group or a hydroxyalkyl group;
X is an alkyl group, an aryl group or an aralkyl group;
p is an integer of 1 to 3 and
q is 0 or 1.

5. A dispersion according to claim 3, wherein said polymer further comprises units derived from a monomer selected from the group consisting of vinyl monomers (C) having an ionic group or a group transferable to an ion and vinyl monomers (D) having a hydroxyalkyl group.

6. A dispersion according to claim 5, wherein said polymer comprises from 0.5 to 30% by weight of units derived from said monomer (C).

7. A dispersion according to claim 5, wherein said polymer comprises from 1 to 40% by weight of units derived from said monomer (D).

8. A dispersion according to claim 3, wherein said monomer (A) is a monomer selected from the group consisting of vinyl alkoxysilanes and acrylate or methacrylate esters having a hydrolyzable silyl group.

9. A dispersion according to claim 3, wherein said polymer further comprises from 30 to 90% by weight of units derived from an alkyl acrylate or methacrylate having from 1 to 30 carbon atoms in the alkyl group.

10. A dispersion according to claim 3, wherein said polymer further comprises from 1 to 60% by weight of units derived from a vinyl monomer having a perfluoroalkyl group of 8 to 20 carbon atoms.

11. A dispersion according to claim 3, wherein said polymer further comprises from 1 to 40% by weight of units derived from an acrylate or methacrylate ester having a polysiloxane group.

12. A dispersion according to claim 3, wherein said monomer (A) is a methacrylate ester further having a carbamate group.

13. A dispersion according to claim 5, wherein said monomer (C) is acrylic acid, methacrylic acid, N,N-dimethylaminoethyl acrylate or N,N-dimethylaminoethyl methacrylate.

14. A dispersion according to claim 3, which further comprises 0.001 to 20% by weight of a non-polymerizable organic acid, ammonia or an amine for neutralization.

15. A dispersion according to claim 3, which further comprises 0.001 to 20% by weight of a catalyst for curing.

16. A dispersion according to claim 3, which further comprises 0.01 to 20% by weight of an uncured epoxy resin.

17. A dispersion according to claim 3, which further comprises 1 to 100% by weight of a rust-inhibiting pigment.

18. A dispersion according to claim 3, which further comprises 10 to 900% by weight of a polyurethane emulsion having no hydrolyzable silyl group and 0.1 to 50% by weight of a cross-linking agent.

19. An article comprising a substrate coated with a dispersion as claimed in claim 3, wherein said polymer is cured at a temperature of from ambient temperature to 200° C.

* * * * *